United States Patent
Cossmann et al.

(10) Patent No.: US 6,430,659 B1
(45) Date of Patent: Aug. 6, 2002

(54) METHOD AND MEANS FOR INCREASING PERFORMANCE OF MULTIPROCESSOR COMPUTER SYSTEMS BY REDUCING ACCESSES TO GLOBAL MEMORY LOCATIONS THROUGH THE USE OF QUANTA

(75) Inventors: Helmut Cossmann, Heidelberg (DE); Herman Dierks, Round Rock, TX (US); William James Hymas, Heidelberg (DE); Satya Sharma, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 09/668,503

(22) Filed: Sep. 22, 2000

(51) Int. Cl.$^7$ .......................... G06F 12/00; G06F 17/30
(52) U.S. Cl. ..................... 711/147; 711/150; 711/141; 707/201; 707/8
(58) Field of Search ............................. 711/147, 153, 711/154, 141, 150; 707/201, 202, 203, 8, 10; 714/6; 709/200, 201, 215, 217, 248, 400

(56) References Cited

U.S. PATENT DOCUMENTS

| | | | | |
|---|---|---|---|---|
| 5,138,713 A | * | 8/1992 | Loten | 709/104 |
| 5,214,776 A | * | 5/1993 | Bagnoli et al. | 711/141 |
| 5,247,673 A | * | 9/1993 | Costa et al. | 711/205 |
| 5,729,735 A | * | 3/1998 | Meyering | 707/10 |
| 6,061,686 A | * | 5/2000 | Gauvin et al. | 707/10 |
| 6,151,606 A | * | 11/2000 | Mendez | 707/201 |
| 6,240,414 B1 | * | 5/2001 | Beizer et al. | 707/8 |
| 6,341,339 B1 | * | 1/2002 | Kontothanassis et al. | 711/148 |

* cited by examiner

Primary Examiner—Do Hyun Yoo
Assistant Examiner—Kimberly McLean
(74) Attorney, Agent, or Firm—David A. Mims, Jr.

(57) ABSTRACT

The present invention relates to means, a method and a computer program product of administrating in a computer system a global data element shared by a multitude of exploiters within said computer system for reducing contention among said exploiters.

It is suggested to execute a first step by a first exploiter of accumulating one or a multitude of modifications performed by said first exploiter with respect to the current contents of said global data element into a first local data element not shared by other exploiters.

In a second step executed by the first exploiter a size of the accumulated modifications in the first local data element with respect to the current contents of the global data element is determined. Moreover it is determined, if said size exceeds a specified quantum.

If said size exceeds the specified quantum, the global data element is updated with the accumulated modifications as new contents.

25 Claims, 7 Drawing Sheets

A: Address X is always valid in CPU 1's cache

| Time | Event | CPU Cycles |
|---|---|---|
| 0 | CPU 1 loads and updates X | 8 |
| 1 | CPU 1 loads and updates X | 8 |
| 2 | CPU 1 loads and updates X | 8 |
| 3 | CPU 1 loads and updates X | 8 |
| 4 | CPU 1 loads and updates X | 8 |
| 5 | CPU 1 loads and updates X | 8 |
| 6 | CPU 1 loads and updates X | 8 |
| 7 | CPU 1 loads and updates X | 8 |

301 Total CPU Cycles: 64

B: Address X is never in either cache.

| Time | Event | CPU Cycles |
|---|---|---|
| 0 | CPU 1 loads and updates X | 20 |
| 1 | CPU 2 loads and updates X | 20 |
| 2 | CPU 1 loads and updates X | 20 |
| 3 | CPU 2 loads and updates X | 20 |
| 4 | CPU 1 loads and updates X | 20 |
| 5 | CPU 2 loads and updates X | 20 |
| 6 | CPU 1 loads and updates X | 20 |
| 7 | CPU 2 loads and updates X | 20 |

302 Total CPU Cycles: 160

FIG. 8

METHOD AND MEANS FOR INCREASING PERFORMANCE OF MULTIPROCESSOR COMPUTER SYSTEMS BY REDUCING ACCESSES TO GLOBAL MEMORY LOCATIONS THROUGH THE USE OF QUANTA

1. BACKGROUND OF THE INVENTION

1.1 Field of the Invention

The present invention relates to means and a method of administrating in a computer system global data elements shared by a multitude of exploiters. More particularly the means and the method of the present invention address said administration of global data elements within the context of multiprocessor computer systems.

1.2 Description and Disadvantages of Prior Art

A well-known area within computer system technology wherein global data elements shared by a multitude of exploiters are faced with the problem of contention among the exploiters for the global data elements is the area of multiprocessor computer systems. Contention among the processors to access a specific memory address is a common performance bottleneck on these multiprocessor computers.

State of the art processors have on-chip caches, where copies of the most frequently accessed memory addresses are stored. These caches are small and can only store a small subset of the entire system memory addresses. An item in the cache can be accessed more quickly than an item in memory, since the cached item is already on the chip, and the actual item must be first fetched over the memory bus of the system. An access which can be serviced from the cache is known as a "hit", otherwise it is a "miss". The time difference between a hit and a miss is measured as the extra CPU cycles required for the access instruction to complete, and is called the "miss penalty". Miss penalties vary for different processors, but are quite significant. On a typical processor, a cache hit for a four byte word may complete in four cycles, but a miss may require an additional twelve cycles. This means that a load from memory is four times longer than one from cache. Thus, the importance and impact of processor caches on system performance is obvious.

However, the effectiveness of processor caches is degraded on multiprocessor systems, when all the processors attempt to access a specific memory address at the same time. When this occurs, "contention" for the memory address is said to exist. A processor may only use the copy of the memory address in its cache, when it has not been modified by another processor since it was loaded into the cache. If the address has been modified by another processor, the value in the cache is said to be "invalid". Invalid cache entries may not be used by a processor, and instead the valid address must be fetched over the memory bus, an operation that requires many more CPU cycles. Thus, in a worst case scenario, when all processors are constantly modifying the same address, the cache entries are never valid, and the cache itself is entirely useless. The system performance is reduced to that of one with no processor caches at all.

This problem of contention commonly occurs for instance with global variables used to manage system resources and as statistic counters or other global variables with a frequent update pattern. A solution currently used by software designers to solve this problem is to replace the global variables with per-CPU variables; i.e. to replace the global variables by local variables dedicated to a specific exploiter. For example, a single memory management pool for the entire system can be replaced by many pools, each of which is only used by a specific CPU. Since the variables for each pool are only used by the specific CPU, contention among the various processors never occurs, since each CPU only uses the variables in the pool assigned to it. This can also be used for certain statistic counters: a single global counter can be replaced with a set of per-CPU counters. Since contention never exists, the cache entries remain valid, and the performance gains of the processor caches remain effective.

However, this approach of assigning variables and resources to specific CPUs, or in general to specific exploiters only, is not always feasible. There are always cases where global variables are required, for instance, to hold system wide, i.e. global values, which cannot be split.

Thus, there is a need in the state of art for further improvement.

1.3 Objective of the Invention

The invention is based on the objective to provide a technology for administrating in a computer system global data elements shared by a multitude of exploiters to reduce contention among the exploiters for the global data elements and to improve performance of the computer system.

It is a further objective to provide this technology within the context of multiprocessor computer systems.

2. SUMMARY AND ADVANTAGES OF THE INVENTION

The objectives of the invention are solved by the independent claims. Further advantageous arrangements and embodiments of the invention are set forth in the respective sub claims.

The present invention relates to means, a method and a computer program product of administrating in a computer system a global data element shared by a multitude of exploiters within said computer system for reducing contention among said exploiters.

It is suggested to execute a first step by a first exploiter of accumulating one or a multitude of modifications performed by said first exploiter with respect to the current contents of said global data element into a first local data element not shared by other exploiters.

In a second step executed by the first exploiter a size of the accumulated modifications in the first local data element with respect to the current contents of the global data element is determined. Moreover it is determined, if said size exceeds a specified quantum.

If said size exceeds the specified quantum, the global data element is updated with the accumulated modifications as new contents.

Contention situations are caused by update operations of the global data element. The invention reduces the probability of a contention occurring for every modification, since the individual modifications (which used to cause contentions) are accumulated within a local data element, and only the accumulated modification to the global data element (which now occurs less often) can cause a contention. This results in a significant reduction of the contention, which directly translates to an increased overall system performance.

4. DESCRIPTION OF THE PREFERRED EMBODIMENT

In the drawings and specification there has been set forth a preferred embodiment of the invention and, although specific terms are used, the description thus given uses terminology in a generic and descriptive sense only and not for purposes of limitation.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The current invention is illustrated based on an implementation for multiprocessor computer systems to reduce the contention for global data elements stored within a common main memory accessed by a multitude of exploiting processors via their local caches. Though this embodies one preferred application of the current invention this may not be understood as a limitation of the applicability of the current invention. The current invention may be applied to all contexts wherein a multitude of exploiters concurrently access a shared global data element.

4.1 Performance Degradation due to Contention for Global Data Elements

This invention deals with the common performance problem of contention among a multitude of exploiters accessing global, i.e. shared, data elements. In the exemplary context of multiprocessor systems the contention is among the processors to access a specific memory address.

Contention leads to performance degradation. This invention describes a method which reduces the contention and thus improves the performance.

Figure 1:
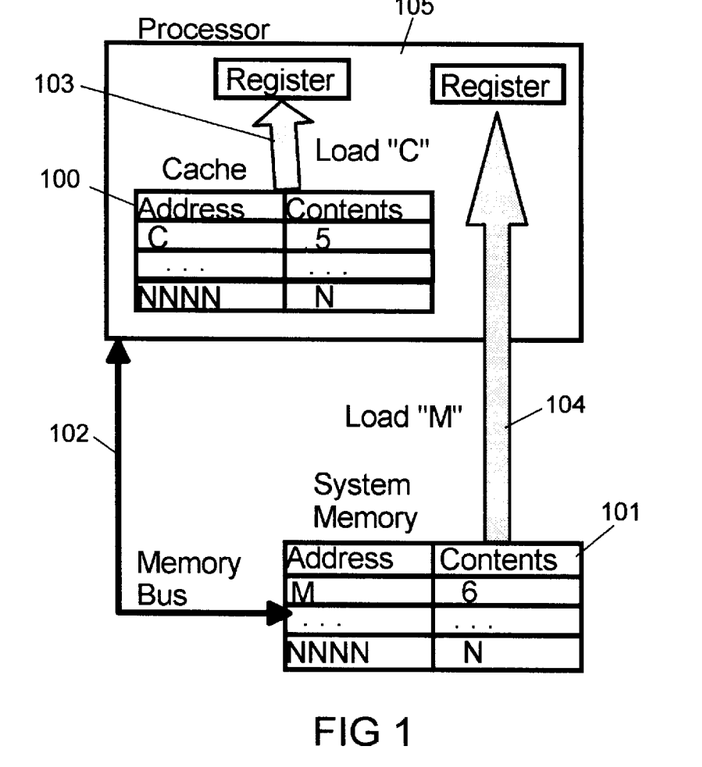
FIG. 1 shows a typical processor architecture with an on-chip cache according to the state of the art.

FIG. 1 shows the common computer architecture, with the on-chip cache 100 of processor 105, and the system memory 101 connected on a memory bus 102. The "load" operation 103 for the data element "C" indicated by the arrow labeled "Load C" requires less cycles, because it can be serviced by the cache. The "load" operation indicated by the arrow labeled "Load M" 104 requires more cycles, because the contents of the memory must traverse the system memory bus. This is because the address "M" is not yet in the on-chip cache (representing a cache miss). Afterward, the address may be placed in the cache, and subsequent operations would require less time.

Figure 2:
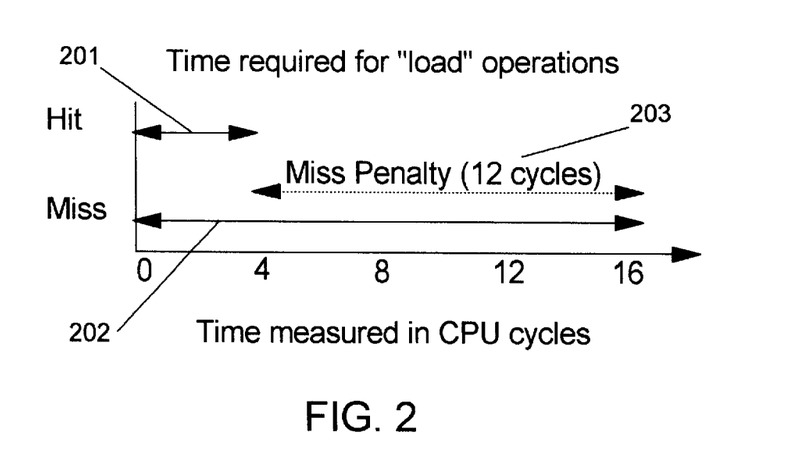
FIG. 2 compares a cache hit and miss, and shows the difference in CPU cycles required, which is the miss penalty.

FIG. 2 shows an example of the difference in CPU cycles required between a cache hit and a cache miss. As in the typical example mentioned above, a cache hit load 201 of four bytes requires four cycles. A miss 202 requires sixteen cycles; thus the miss penalty 203 is twelve additional cycles. The end result is that a miss takes four times as long as a hit. This penalty has to be "paid" each time 2 exploiters enter into a contention situation for the global data element.

Figure 3:
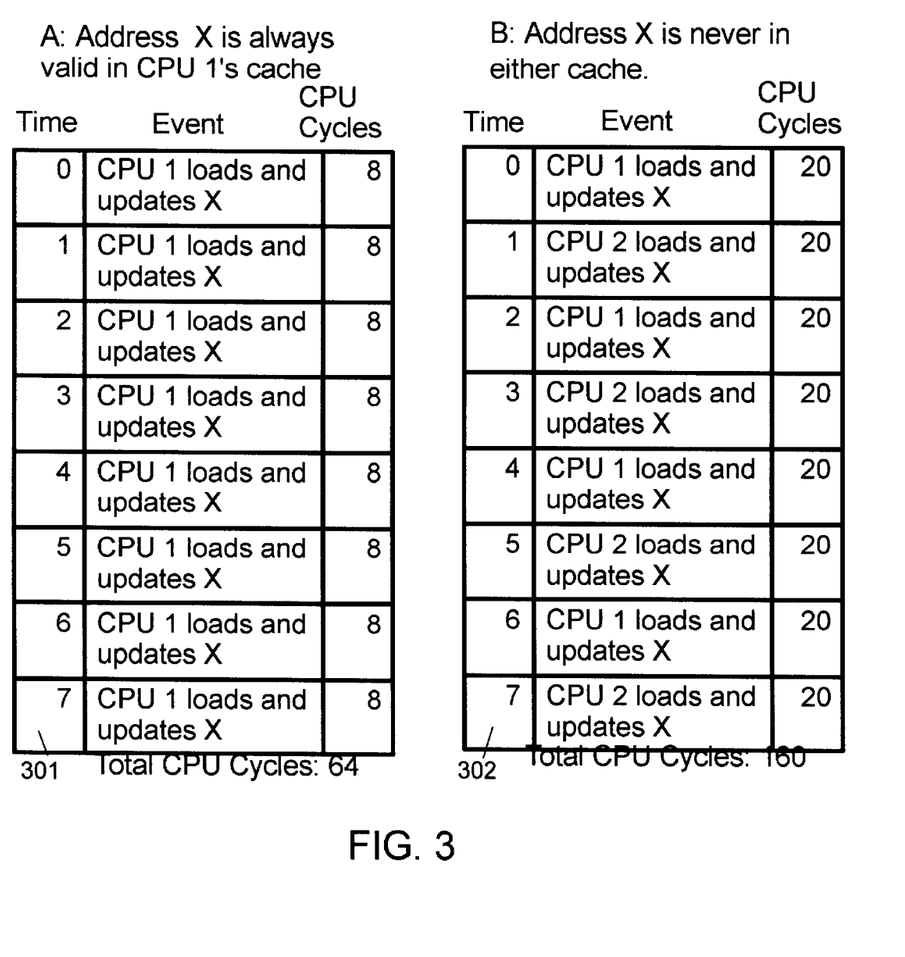
FIG. 3 details how contention leads to higher CPU cycle consumption, which decreases overall system performance.

FIG. 3 shows an example of how contention degrades the effectiveness of the processor caches and the overall performance of the system. For simplicity, it is assumed that operation is simply a "load" and "store" (after modifications) of a specific address, but that this causes cache entries of this address in other processors to be invalidated; every "store" operation of a first processor of the contents of a specific address will update said contents in said first processor's cache as well as in the global memory and via cache coherence protocols the contents of said specific address residing in the caches of other processors will be invalidated. Using the metrics of above, a load and store with a cache hit would simply require eight cycles (four to load, four to store). However, when a miss occurs during a load, the miss penalty of twelve cycles must be paid. Thus, when a miss occurs, the entire load and store operation requires twenty cycles. Both tables in the FIG. 3 detail a series of these operations (events) over time, and show the cycles required to perform the operation. In case A 301, only CPU 1 is accessing address X, so every operation only requires eight cycles. In case B 302, CPU 1 and CPU 2 are alternately invalidating each others cache entry due to a contention situation for address X; thus, the miss penalty of twelve cycles must always be paid, causing the required cycles for each operation to jump to twenty. This leads to the result that the same series of eight update operations on an address requires many more CPU cycles to perform the same work. Thus overall system performance, in terms of CPU cycles available to perform other work has decreased significantly. Thus, FIG. 3 shows how contention causes more CPU cycles to be consumed for the same amount of work.

An important observation of the current invention is that the workload and number of processors on a system are key factors which can cause contention. With an increasing number of processors (i.e. with an increasing number of its exploiters), there is a greater chance that any number of them will attempt to access a certain specific memory location, when all the processors are running the same code path. This can occur, for example, on a multiprocessor Web server, where all processors are simultaneously performing network operations. These problems often first surface when the number of processors is increased on a system running the same workload, and the performance gains expected from the addition of the new processors are not achieved. When contention occurs, individual access instructions require more CPU cycles. Thus, the overall CPU usage (measured as cycles busy) is higher, but less work is performed, since no greater number of instructions are executed: the same number of instructions is just requiring more CPU cycles. If the contention could be avoided, these wasted CPU cycles could be used to perform more other work. In other words, reducing contention reduces wasted CPU cycles, which in turn enables the system to achieve higher performance. Since newer systems are being produced, with an even greater number of processors, these contention problems are becoming more common as bottlenecks to overall system performance.

This problem of contention commonly occurs with global variables used to manage system resources and as statistic counters. In general the problem relates to the concurrent administration, i.e. the concurrent "Read" and "Write" operations, of global data elements shared by a multitude of exploiters. A common solution currently used by software designers to solve this problem is to replace the global variables with per-CPU variables; that is, global data elements are replaced by "local" data elements, which are not shared between the multitude of exploiters but which are dedicated to individual exploiters only. For example, a single memory management pool for the entire system can be replaced by many pools, each of which is only used by a specific CPU. Since the variables for each pool are only used by the specific CPU, contention among the various processors never occurs, since each CPU only uses the variables in the pool assigned to it. This can also be used for statistic counters: a single global counter can be replaced with a set of per-CPU counters. Since contention never exists, the cache entries remain valid, and the performance gains of the processor caches remain effective.

Figure 4:
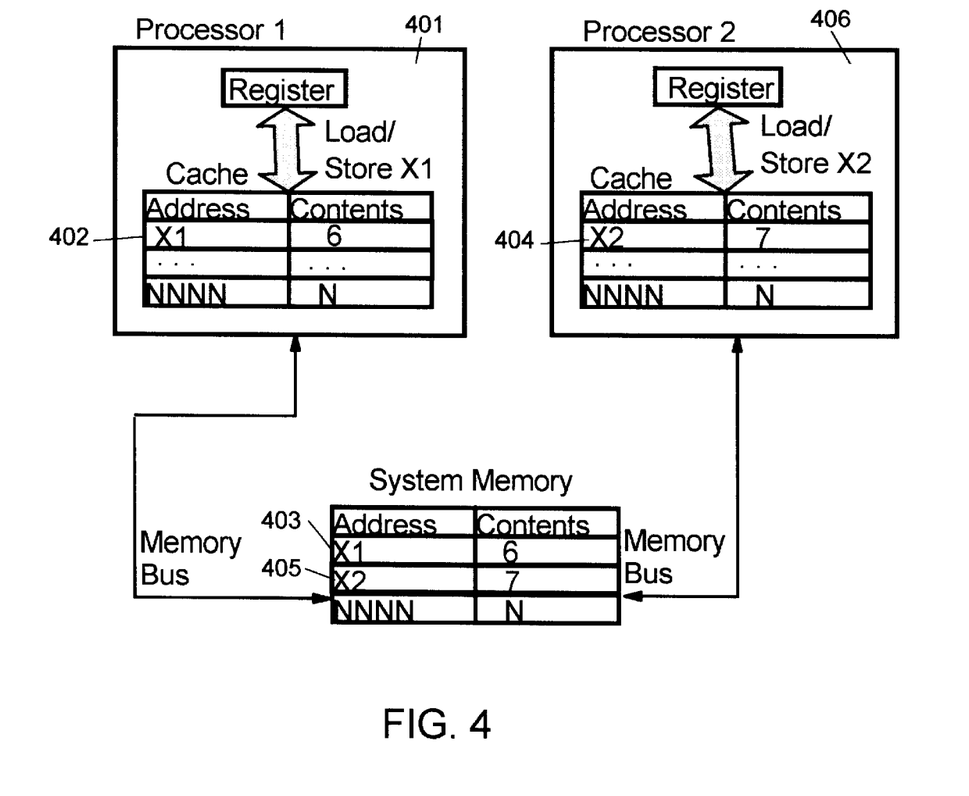
FIG. 4 shows the solution for contention where variables can be split among CPUs.

FIG. 4 shows the method of assigning local data elements to individual exploiters by assigning specific variables to specific processors. Only processor1 401 uses variable X1 in its cache 402 and in the main memory 403; only processor2 406 uses variable X2 in its cache 404 and in the main memory 405. Thus without sharing any data element no contention can occur and they never invalidate each other's cache entries, and all accesses are hits (indicated by the short arrows within the FIG. 4).

However, this method of dividing variables and resources to specific CPUs, or in other words the method of only using non-shared local data elements among different exploiters, is not always feasible. There are always cases where global variables are required to hold system wide values, which cannot be assigned to exclusive exploiters. For instance, for the example given above, each processor might have its own memory pool, but the allocation routines might need to know the total usage of the entire system to make decisions on whether to perform or deny memory allocation requests. In other words, there needs to be one memory location holding a value for the entire system representing a global data element. A hypothetical approach of requiring the programs to sum the individual usage counts would be inefficient (given the large number of processors), and again lead to the contention (as the individual usage counts have to be accessed for execution of this operation) that was meant to be avoided in the first place. The same is true for other statistical counters: those that are needed immediately to make decisions cannot be split among processors. At the moment there is no solution known within the state of the art for reducing contention for these situations.

Figure 5:
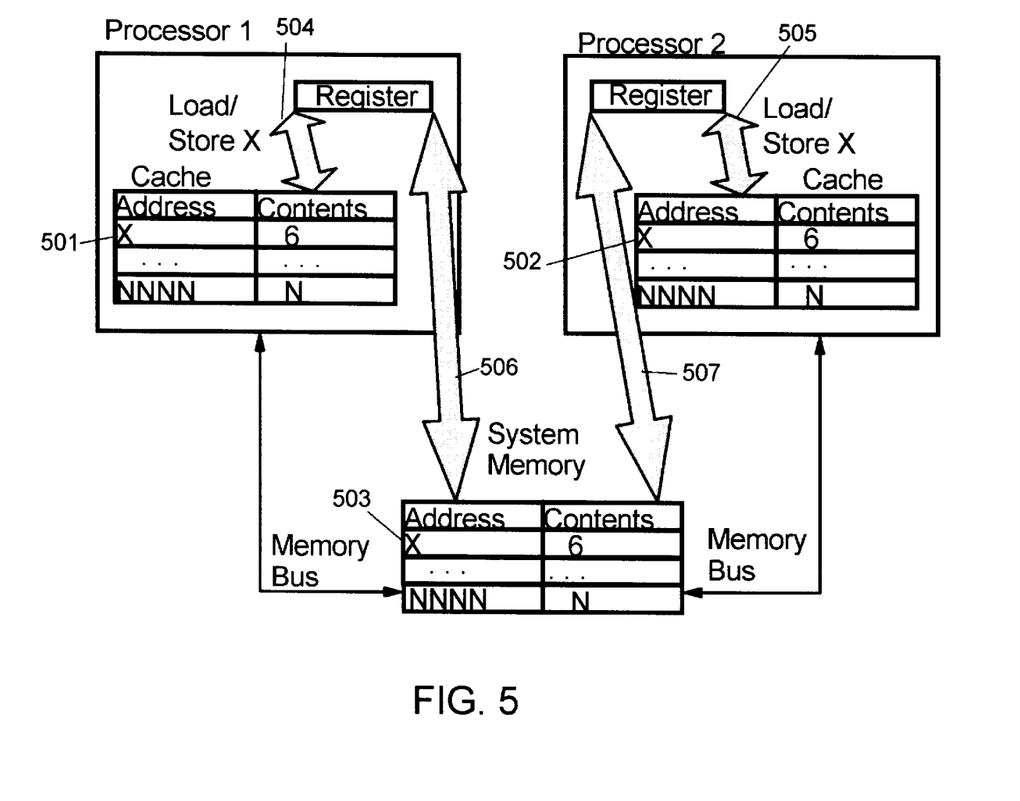
FIG. 5 shows the case where variables cannot be split.

FIG. 5 exemplifies such a case where global variables, represented as variable X in main memory 503 and in the cache 501 of processor1 and the cache 502 of processor2, are necessary, and cannot be split among specific processors. Access operations are a mix of hits and misses; the hits are the short arrows 504 and 505, the misses are the long arrows 506 and 507. When contention increases, more of the accesses are long types (that is, require more CPU cycles), and overall performance degrades. In the case described in FIG. 3, all accesses would be long ones.

4.2 Quantum Based Approach for an Alternating Administration of a Certain Data Element as a Global Data Element or Local Data Element The motivation for this invention originated in a project to improve the performance of a multiprocessor UNIX server running a Web server benchmark. The benchmark is called SPECWeb96 (see www.spec.org for further details), and uses a set of client computer systems connected over a LAN to a Web server to simulate and measure the server's actual performance in an Internet environment. The clients generate a requested load of transactions over a period of time and measure if the server can actually service all those requests; the result is stated in units of transactions per second (TPS).

During the testing a bottleneck was reached. The server could achieve a certain level of transactions per second with an average CPU utilization of about 60%. However, any attempts to increase the load generated by the clients merely increased the CPU utilization of the server, without increasing the transactions per second of the benchmark. In other words, the machine was busier, but was not getting any more work done. In fact, the number of transactions per second achieved actually fell as the load of the clients was increased further.

Hardware tracing and analysis of the memory bus using special tools revealed that there was extreme contention for one memory address, "kmeminuse" (measuring, as already indicated by its name, the amount of occupied memory). Over 50% of the traffic on the bus were requests or invalidation notifications for this address. Thus, negative effects of contention detailed above were limiting the performance of the machine for the benchmark. If this could be avoided, the machine could achieve higher benchmark numbers, and therefore be a better product with a higher throughput and performance as a Web server for the Internet.

However, kmeminuse is a global variable used to measure and control memory usage of the network memory subsystem. It prevents the system from committing too much memory for network activities, which would cause shortages and problems in other subsystems. This variable is one of the type that cannot be split among individual processors. In other words, the common solution for contention described above could not be used for this variable. The memory allocation routines require instantaneous access to the variable for accurate information detailing overall network memory usage.

Careful insight and analysis into the cause, effects and limiting conditions of the problem led to the invention of a mechanism that eliminated the contention, while at the same time still offering the memory services of the operating system adequate information on the global kmeminuse variable.

It is helpful to understand the nature of the functionality of network memory (not limiting the applicability of the current invention to this type of data elements). When data arrives on a network device, network memory is allocated, and the data is copied into that memory. It then proceeds up the protocol stack of the communication medium in the kernel, where it is eventually copied to memory provided by a user process that wishes to receive the data, for instance, a Web server. The network memory is then freed. In the other direction, when a user process transmits data, network memory is allocated, and the user data copied into that memory. The data now proceeds down the protocol stack until it is transmitted on a network device. The network memory is then freed. As previously stated, the purpose of the kmeminuse variable is to monitor and control the usage of network memory. When an entity (a network device driver or a user process) attempts to allocate network memory, the value of kmeminuse is checked. If the allocation would exceed a system limit (known as "the wall"), the allocation would be denied. Otherwise the request would be granted and the kmeminuse variable incremented accordingly. When network memory is freed, the kmeminuse variable is decremented accordingly. This mechanism prevents the system from committing too much system memory to the network memory subsystem. The important aspect to realize here is that memory allocations are transient in nature: the allocation only exists for the short time that the data transverses the protocol stack. But, in a system performing a network intensive workload, freed memory will probably be reallocated very quickly: for every request received, some response will be sent, or when a segment of a response is sent, the next segment will be sent, etc. Or in other words, as kmeminuse is measuring a certain system property its value will increase and decrease periodically in accordance to system workload, but the changes occur with high frequency and tend to cancel each other out.

Moreover, the consequences of each update to the kmeminuse variable need to be considered: each and every update by one processor will cause an invalidation in the other processors' caches. This, in turn causes more CPU cycles to be wasted on the cache miss penalty, as shown for instance in FIG. 3, and what eventually leads to performance deterioration. An important observation of the current invention is that clearly a better solution would be a mechanism that updates the kmeminuse variable less frequently. Furthermore, considering the fact mentioned above that freed memory is likely to be reallocated very quickly, some of these updates are of no significant value over a reasonable time frame: the variable is decremented, but then immediately incremented. Thus, the sequence of modifications to the global variable kmeminuse have the tendency to at least partially cancel the overall effect.

Another interesting aspect, which will ease the implementation of the current invention, is the observation that existing multiprocessor operating systems already comprise local data elements assigned to the individual processors, which are not shared with the other processors within the system. That is current operating systems already exploit a per-CPU variables solution: each processor has its own structure containing variables used for managing its own pool of resources and statistics. As it will be described later, the presence of these per-CPU structures merely facilitated in the implementation of the invention by extending it further with variables of local nature only.

In essence, based on the observations above, the current invention shows that a hybrid solution will solve the contention problem mentioned above of a multitude of exploiters accessing and administrating a global data element shared between the exploiters. The current invention proposes treating a global data element during specific time periods as a local data element, as long as the modifications of the data element does not sum up to a "size" larger than a certain "quantum". During this situation, each exploiter is accumulating the modifications performed by that exploiter within a local data element only (not shared with other exploiters). When the size of the accumulated modifications exceeds a specified quantum, the accumulated modifications are used to update the global data element; i.e. only during this particular time period may a contention situation with other exploiters be caused. As the probability of a contention no longer adheres to each individual modification operation but only to the update operation with the accumulated modifications, the probability for contention can be reduced significantly.

Explained in more detail, a hybrid approach in accordance with the current invention, uses the per-CPU variables combined with a global variable. The global kmeminuse variable still exists, and is used as before. Since the memory allocations run on every processor, this is read into the cache of every processor, as before. However, each CPU now has a new variable of local nature only where an impending delta change to the kmeminuse variable is stored. Since each CPU has its own delta variable, there is no problem with contention. Updates do not invalidate cache entries in other processors. The memory allocation routines are changed to update the delta variable for allocations and frees on the processor where the operation occurs. The delta is only applied to the global variable by the memory routines when the absolute value (either positive or negative) exceeds a significant amount, the "quanta". Thus, frequent allocations and frees on one processor which cancel each other out, are confined to the CPU delta variable: the global kmeminuse variable is not updated and invalidated in other caches. And in fact, when a steady state is reached, where the fluctuations never exceed the delta, the global variable never needs to be updated at all!

Figure 6:
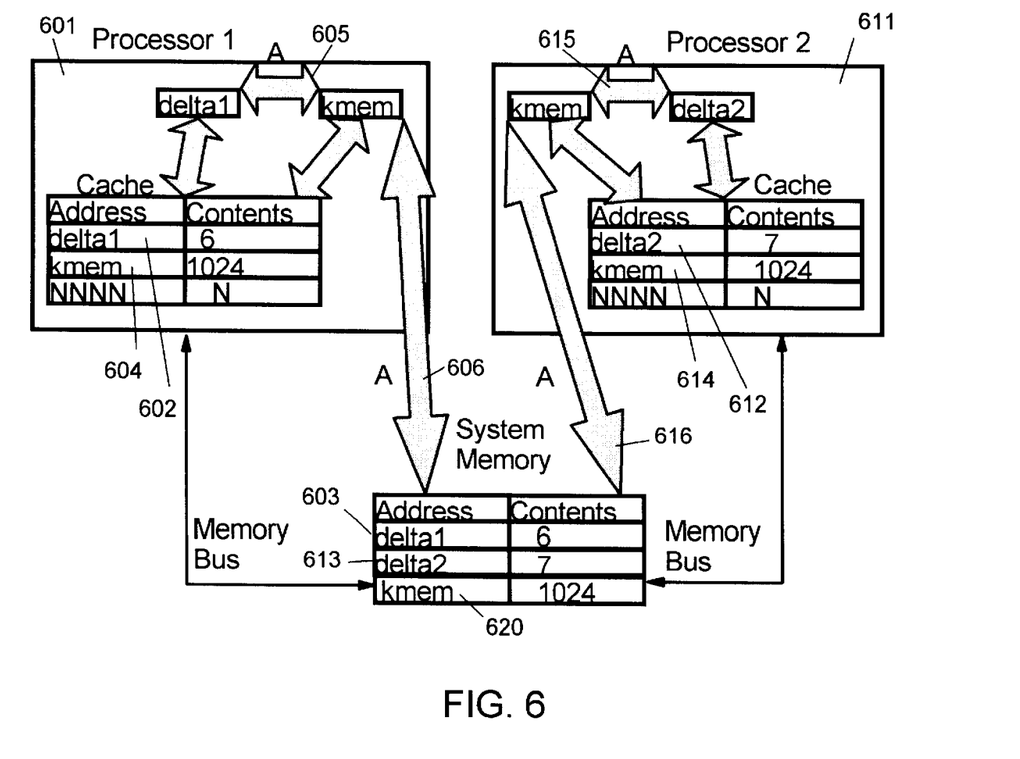
FIG. 6 shows an specific implementation of the invention where the contention can be reduced by a hybrid combination of global and local data elements.

FIG. 6 shows the invention in its preferred implementation for the administration of global variables within multiprocessor computer systems. Each processor 601 and 611 is enhanced by maintaining its own "delta variable" (delta1 602 and 603 respectively, delta2 612 and 613 respectively, . . . ), which is updated frequently and is of local nature, dedicated only to the individual processor. Since each processor has its own variable, there is no contention. The processors also read the value of the global variable kmeminuse 604, 614, 620, but this remains valid in the cache longer. The value of kmeminuse is only changed when the quanta of the delta has been exceeded. Thus, the "costly" operations indicated by arrows labeled A occur less frequently, than they would as in the case in FIG. 5: the sequences of arrows 605, 606 and 615, 616 respectively correspond to two types of operations:

1. the operation wherein the global variable kmeminuse is being updated by a processor as said processor's quantum of accumulated modifications is exceeded and the new value of the global variable kmeminuse has to be written to system memory;
2. the operation wherein the global variable kmeminuse has been updated by another processor resulting in an invalidation of the copy of the global variable within the cache. Due to this miss the new value of the global variable has to be fetched from system memory to the particular processor and optionally the delta variable has to be updated in accordance to the global variable's new value.

As mentioned above current operating systems already allow each processor to manage its own pool of local, per-CPU variables. For global variables like kmeminuse, the current invention proposes enhancing the per-CPU variables with corresponding local "delta" variables, which then can be exploited for reducing the contention according to above hybrid administration scheme.

Of course the system described above can be enhanced to multiple global data variables with corresponding local data variables. This allows for finer granularity in the application of the invention for this problem. The choice of the quanta size is also application specific: in the current example the quanta used is sixteen times the allocation size (sixteen frees or allocations of the fixed size power of 2). This proved to be a practical number, and the multiplication is just a simple shift operation. The end result of the implementation of this invention was to boost the SPECWeb96 benchmark performance by the very significant amount of about 15% for the machine being tested.

In a further extension of the current invention also the size of the quantum may be dynamically readjusted in accordance with the current value of the global data element. For instance, if the global variable is measuring some resource allocated by the computer system and if the variable is updated to the new value of X %, the new quantum is redefined to a value not larger than (100−X)/N % where N denotes the number of exploiters. With this approach it is made sure, that the sum of accumulated modifications of all exploiters not yet reflected within the value of the global variable never exceeds the system limit.

4.3 Further Extensions of the Current Invention

Figure 7:
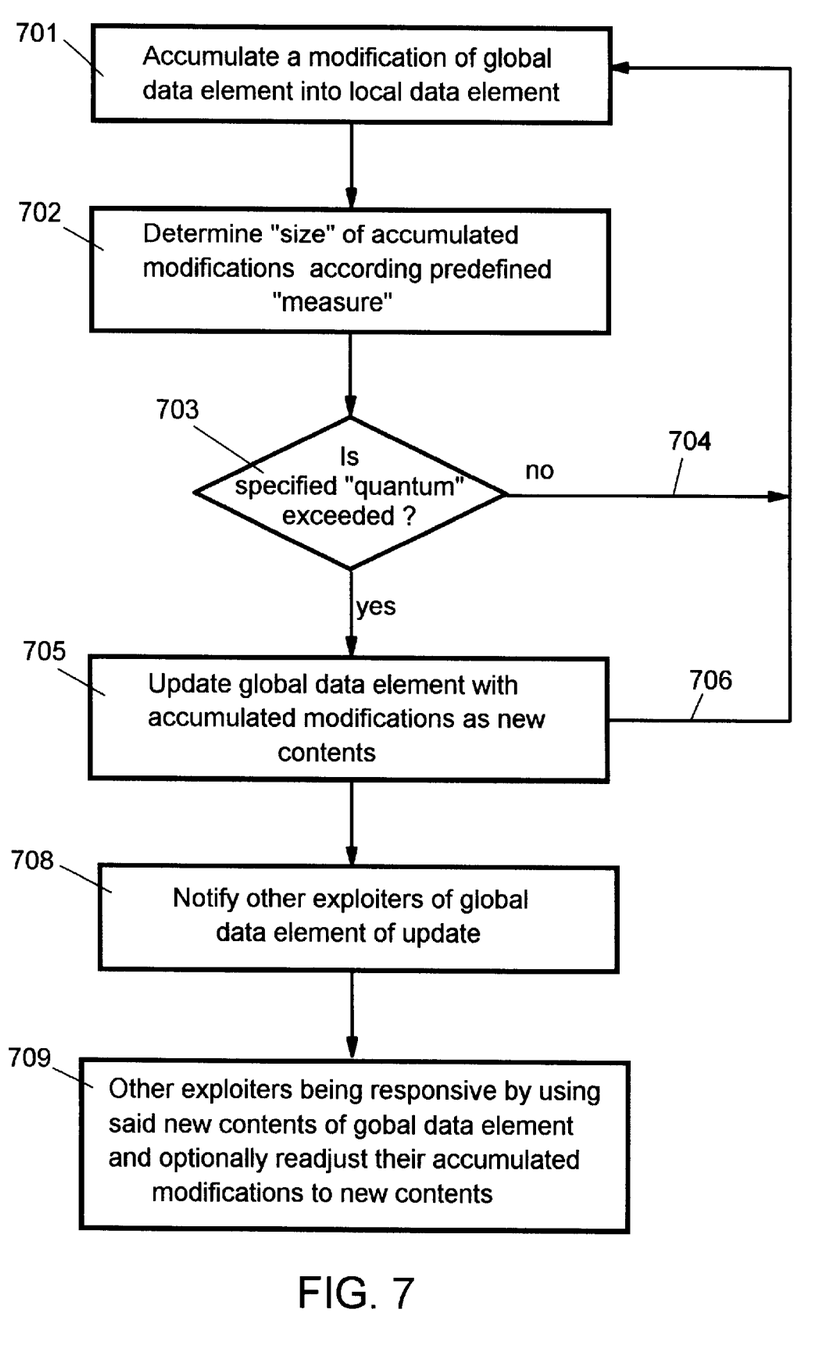
FIG. 7 visualizes a summarizing and generalizing view of the current invention.

FIG. 7 visualizes a summarizing view of the current invention describing it in its general representation.

Given a global data element shared by a multitude of exploiters, the current invention proposes introducing a corresponding local data element for each exploiter. It is pointed out that no specific assumption on the structure of the data element has to be made; that is, the internal structure of the data element may be of any complexity and may range from a single elementary number up to complex structures.

Referring to FIG. 7 the invention proposes to accumulate in step 701 any modification to the global data element not directly into the global data element but into its corresponding local data element specific to that exploiter, which intended to modify the value of the global data element. Different possibilities do exist to implement the accumulated modifications. One possibility would be that the local data element just stores the current value of the global data element according to the view of that particular exploiter. Another possibility would be that the local data element reflects the "Difference" (or in other words the "Delta") with respect to the value still stored in the global data element. The second approach offers more advantages within the following steps required to determine the "Size" of the accumulated modifications as will be clear from steps 702 and 709 below; in this case the value of the local data elements directly reflects this "Size". This later approach has been used for the embodiment discussed together with FIG. 6.

Within step 702 the method determines the "Size" of the accumulated modifications. It is emphasized that any arbitrary complex "Measure" may be used to determine this size relating to the difference of the value as currently stored within the global data element and its actual contents comprising the accumulated modifications by that particular exploiter.

If the global data element just reflects a numerical value the numerical difference between the old and current value might be chosen as this measure.

But the general concept of the current invention enables the consideration of the "costs" and "consequences" of an operation within said measure. Referring to the specific embodiment discussed together with FIG. 6 above the situation is the following: in this case, an update of a variable causes a high "cost" in terms of price paid for the miss penalty since it invalidates cache entries in other processors. Thus, it makes sense to "bundle" smaller updates into a larger one, so the price is only paid once for a set of operations. In this specific implementation, the cache miss penalty was the cost considered. However, this idea could also be applied using other metrics. An important example relates to the code path lengths, which are the number of instructions required to perform a specific operation. Thus the required code path length to update the global data element with the accumulated modifications stored within the local data element is proposed to be used as above measure (for a certain embodiment of the current invention). Such a type of measure could be beneficial for system calls of an operating system maintaining global data elements. These system calls could be modified to also "bundle" specific operations in accordance with the current invention. Calls which cause smaller changes would be bundled in the delta and the call would return early, in other words, a "fast-path" which required fewer instruction. Only when the delta is exceeded would the entire "full-path" be executed.

Within step 703 a test is made by determining, if said size exceeds a specified quantum. If the quantum is not exceeded the method simply returns along the path 704 and iterates the method starting again with step 701. Only if the size determined above exceeds the quantum will the global data element be updated with the accumulated modifications resulting in a new content of the global data element within step 705. The important consequence is that the required "costs" to update the global data element have to be paid less frequently, namely only if the corresponding quantum is exceeded. Another important advantage is the reduction of contention between the various exploiters as the probability for contention is limited to that period of time when the quantum has been exceeded and the global data element has to be updated accordingly. Reduced contention means less CPU usage, which directly translates to increased overall system performance. Moreover the current invention achieves that global data elements are updated only when significant changes have occurred, with the beneficial consequence that the contents (as seen by the individual exploiters) of the global data elements remain valid for a much longer time period. As long as only "Small" modifications occur there is no reason to update the global data element. The individual modifications are "bundled" into a more significant modification, which is used more effectively to update the global data element. In many application areas of the current invention, the individual modifications to the global data element have the strong tendency for canceling their effects at least partially (the example described above of measuring resource allocations within a computer system is a very important example of this type). Thus the current invention offers the possibility to establish a "Steady State", wherein the contents of the global data element remains valid forever, on average, the modifications are mutually canceling out each others' effects. Translated to the specific embodiment discussed in the context of FIG. 6 this means that a "Steady State" is reached; the copies in the caches will remain valid forever. All accesses will be cache hits, and the miss penalty will never occur.

In addition to iterating the method along path 706 the method may optionally proceed with step 708, by notifying other exploiters (also using the current invention) of the update of the global data element.

Within step 709 other exploiters are responsive to this notification and will use for their further processing the new, updated contents of the global data element. Depending on the specific implementation of the accumulated modifications this could mean that the notified exploiters would have to readjust their locally accumulated modifications with respect to the new contents of the global data element.

Through this combination of global data elements and corresponding local data elements (being of significance only to the individual exploiters), most of the modifications are confined to the local data elements. Notifications relating to the global data element which would result in the extra invalidation processing by other exploiters, are limited to accumulated, i.e. "larger", modifications only occurring less frequently.

Figure 8:
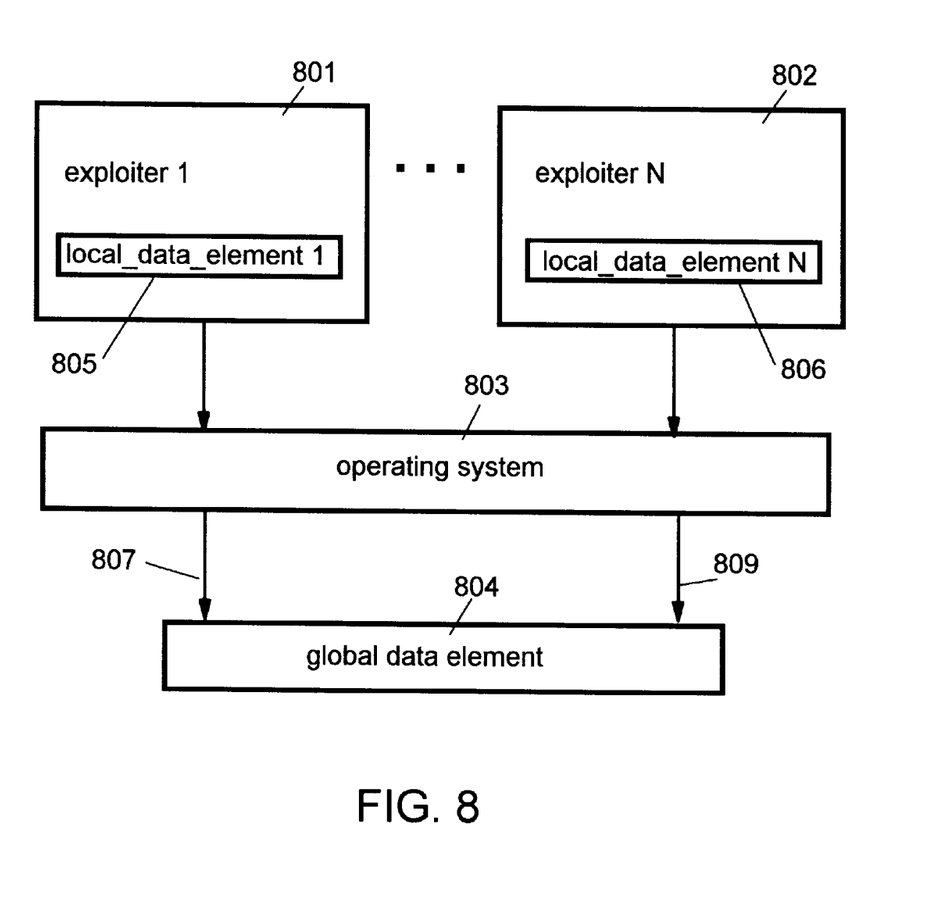
FIG. 8 depicts a further embodiment of the current invention applying it to parallel processes controlled by an operating system.

FIG. 8 depicts a further embodiment of the current invention applying it to parallel processes controlled by an operating system.

In this embodiment the exploiters in accordance with the current invention are the processes 801 up to 802 controlled by the operating system 803 (independent of the number of parallel executing processors on which the operating system is executed). For the global data element 804 shared by the exploiting processes corresponding local data elements 805 up to 806 are provided dedicated only to the individual processes. Applying the invention outlined together with FIG. 7 within this context results in above mentioned benefits. As the operating system only needs to be involved (by executing system calls 807 up to 809 to update the global data element) if the size of the accumulated modifications within the local data elements 805 up to 806 exceeds the specified quantum, the execution of a significant amount of operating-system instructions could be saved.

A further area the current invention may be applied to is the area of NUMA systems. "Non-Uniform Memory Access" systems (NUMA) are formed by coupling nodes at their memory busses. Each node represents a complete computer hardware system. Such a node may be realized by Symmetric Multiprocessors (SMP) offering every processor equal access using normal load and stores to all of that particular SMP's memory. Through a coupling facility comprising a directory all the local memories of all individual nodes may be glued together to form a single global and uniform memory space; that is, each processor is able to address with the help of above mentioned directory each data element under the same address no matter whether this data element actually is stored within the local memory of this processor or whether it is stored within the local memory of another and remote node. In spite of these "transparency", references to remote memories take longer than references to a node's local memory; that's why this architecture is called "non-uniform", referring to an non-uniformed access time.

In an equivalent manner to the embodiment of FIG. 8 the current invention may be applied to these NUMA architectures taking into account the "non-uniform" latency time of accesses to local memory and global memory (realized by a local memory of a remote node).

The example of FIG. 8 and that of NUMA systems once more show the wide applicability of the current invention.

What is claimed is:

1. A computerized method of administrating in a computer system a global data element shared by a multitude of exploiters within said computer system for reducing contention, said method comprising a first-step executed by a first exploiter of accumulating one or a multitude of modifications performed by said first exploiter with respect to the current contents of said global data element into a first local data element not shared by other exploiters;

a second-step executed by said first exploiter of determining a size of said accumulated modifications in said first local data element with respect to said current contents of said global data element and determining, if said size exceeds a specified quantum;

a third-step of updating, if said size exceeds said specified quantum, said global data element with said accumulated modifications as new contents.

2. A computerized method of administrating in a computer system a global data element shared by a multitude of exploiters within said computer system for reducing contention according to claim 1, said method comprising a fourth-step of notifying a second exploiter of said updating, whereby said second exploiter is executing said first-step, said second-step and said third-step with respect to accumulated modifications of said second exploiter in a second local data element not shared with other exploiters, and, in response to said fourth-step, a fifth-step of causing said second exploiter to readjust accumulated modifications in said second local data element with respect to said new contents of said global data element if required, and of causing said second exploiter to execute said first-step, said second-step and said third-step with respect to said new contents of said global data element.

3. A computerized method of administrating in a computer system a global data element shared by a multitude of exploiters within said computer system for reducing contention according to claim 2, wherein said size is rated based on a predefined measure.

4. A computerized method of administrating in a computer system a global data element shared by a multitude of exploiters within said computer system for reducing contention according to claim 3, wherein, if said global data element comprises a numerical value, said measure is based on the difference of said current contents and said next contents of said global data element, or wherein said measure is based on an estimated execution path length required to update said current contents of said global data element with said accumulated modifications.

5. A computerized method of administrating in a computer system a global data element shared by a multitude of exploiters within said computer system for reducing contention according to claim 3, wherein said global data element comprises a measure for the amount of a resource allocable by said computer system.

6. A computerized method of administrating in a computer system a global data element shared by a multitude of exploiters within said computer system for reducing contention according to claim 5, wherein said specified quantum is dynamically redefined depending on said new contents of said global data element.

7. A computerized method of administrating in a computer system a global data element shared by a multitude of exploiters within said computer system for reducing contention according to claim 3, wherein said exploiters are parallel processes controlled by an operating system.

8. A computerized method of administrating in a computer system a global data element shared by a multitude of exploiters within said computer system for reducing contention according to claim 5, wherein said computer system is a multiprocessor system with a global memory and said exploiters are individual processors, and wherein said global data element comprises a measure for the memory allocable to any of said exploiters.

9. A computerized method of administrating in a computer system a global data element shared by a multitude of exploiters within said computer system for reducing contention according to claim 3, wherein said computer system is a system according to the NUMA architecture with local memory attached to each NUMA node and the combination of all of said local memories forming the global memory.

10. Means of administrating in a multiprocessor computer system a global data element shared by a multitude of processors within said computer system in a global memory for reducing contention, said means comprising means of a first-type executable by a first processor for accumulating one or a multitude of modifications performed by said first processor with respect to the current contents of said global data element into a first local data element not shared by other processors;

means of a second-type executable by said first processor for determining a size of said accumulated modifications in said first local data element with respect to said current contents of said global data element and determining, if said size exceeds a specified quantum;

means of a third-type for updating, if said size exceeds said specified quantum, said global data element with said accumulated modifications as new contents.

11. Means of administrating in a multiprocessor computer system a global data element shared by a multitude of processors within said computer system in a global memory for reducing contention according to claim 10, said means comprising means of a fourth-type for notifying a second processor of said updating, whereby said second processor is enabled to execute means of said first-type, means of said second-type and means of said third-type with respect to accumulated modifications of said second processor in a second local data element not shared with other processors, and, means of a fifth-type, responsive to means of said fourth-type, for causing said second processor to readjust accumulated modifications in said second local data element with respect to said new contents of said global data element if required, and for causing said second processor to execute means of said first-type, means of said second-type and means of said third-type with respect to said new contents of said global a data element.

12. Means of administrating in a multiprocessor computer system a global data element shared by a multitude of processors within said computer system in a global memory according for reducing contention to claim 11, wherein said size is rated based on a predefined measure.

13. Means of administrating in a multiprocessor computer system a global data element shared by a multitude of processors within said computer system in a global memory according for reducing contention to claim 12, wherein, if said global data element comprises a numerical value, said measure is based on the difference of said current contents and said next contents of said global data element, or wherein said measure is based on an estimated execution path length required to update said current contents of said global data element with said accumulated modifications.

14. Means of administrating in a multiprocessor computer system a global data element shared by a multitude of processors within said computer system in a global memory according for reducing contention to claim 12, wherein said global data element comprises a measure for the amount of a resource allocable by said computer system.

15. Means of administrating in a multiprocessor computer system a global data element shared by a multitude of processors within said computer system in a global memory for reducing contention according to claim 14, wherein said specified quantum is dynamically redefined depending on said new contents of said global data element.

16. Means of administrating in a multiprocessor computer system a global data element shared by a multitude of processors within said computer system in a global memory for reducing contention according to claim 12, wherein said multiprocessor computer system is a system according to the NUMA architecture with local memory attached to each NUMA node and the combination of all of said local memories forming the global memory.

17. A computer program product in a computer-readable medium for use in a data processing system for administrating in a computer system a global data element shared by a multitude of exploiters within said computer system for reducing contention, said computer program product comprising instructions executable in a first-step by a first exploiter for accumulating one or a multitude of modifications performed by said first exploiter with respect to the current contents of said global data element into a first local data element not shared by other exploiters;

instructions executable in second-step by said first exploiter for determining a size of said accumulated modifications in said first local data element with respect to said current contents of said global data element and determining, if said size exceeds a specified quantum;

instructions executable in a third-step for updating, if said size exceeds said specified quantum, said global data element with said accumulated modifications as new contents.

18. A computer program product in a computer-readable medium for use in a data processing system for administrating in a computer system a global data element shared by a multitude of exploiters within said computer system for reducing contention according to claim 17, said computer program product comprising instructions executable in a fourth-step for notifying a second exploiter of said updating, whereby said second exploiter is executing said first-step, said second-step and said third-step with respect to accumulated modifications of said second exploiter in a second local data element not shared with other exploiters, and, instructions executable in a fifth-step in response to said fourth-step for causing said second exploiter to readjust accumulated modifications in said second local data element with respect to said new contents of said global data element if required, and for causing said second exploiter to execute said first-step, said second-step and said third-step with respect to said new contents of said global a data element.

19. A computer program product in a computer-readable medium for use in a data processing system for administrating in a computer system a global data element shared by a multitude of exploiters within said computer system for reducing contention according to claim 18, wherein said size is rated based on a predefined measure.

20. A computer program product in a computer-readable medium for use in a data processing system for administrating in a computer system a global data element shared by a multitude of exploiters within said computer system for reducing contention according to claim 19, wherein, if said global data element comprises a numerical value, said measure is based on the difference of said current contents and said next contents of said global data element, or wherein said measure is based on an estimated execution path length required to update said current contents of said global data element with said accumulated modifications.

21. A computer program product in a computer-readable medium for use in a data processing system for administrating in a computer system a global data element shared by a multitude of exploiters within said computer system for reducing contention according to claim 19, wherein said global data element comprises a measure for the amount of a resource allocable by said computer system.

22. A computer program product in a computer-readable medium for use in a data processing system for administrating in a computer system a global data element shared by a multitude of exploiters within said computer system for reducing contention according to claim 21, wherein said specified quantum is dynamically redefined depending on said new contents of said global data element.

23. A computer program product in a computer-readable medium for use in a data processing system for administrating in a computer system a global data element shared by a multitude of exploiters within said computer system for reducing contention according to claim 19, wherein said exploiters are parallel processes controlled by an operating system.

24. A computer program product in a computer-readable medium for use in a data processing system for administrating in a computer system a global data element shared by a multitude of exploiters within said computer system for reducing contention according to claim 21, wherein said computer system is a multiprocessor system with a global memory and said exploiters are individual processors, and wherein said global data element comprises a measure for the memory allocable to any of said exploiters.

25. A computer program product in a computer-readable medium for use in a data processing system for administrating in a computer system a global data element shared by a multitude of exploiters within said computer system for reducing contention according to claim 19, wherein said computer system is a system according to the NUMA architecture with local memory attached to each NUMA node and the combination of all of said local memories forming the global memory.

* * * * *